Aug. 9, 1955
G. L. CARMACK
2,714,908
SLAW CUTTER
Filed Feb. 5, 1953
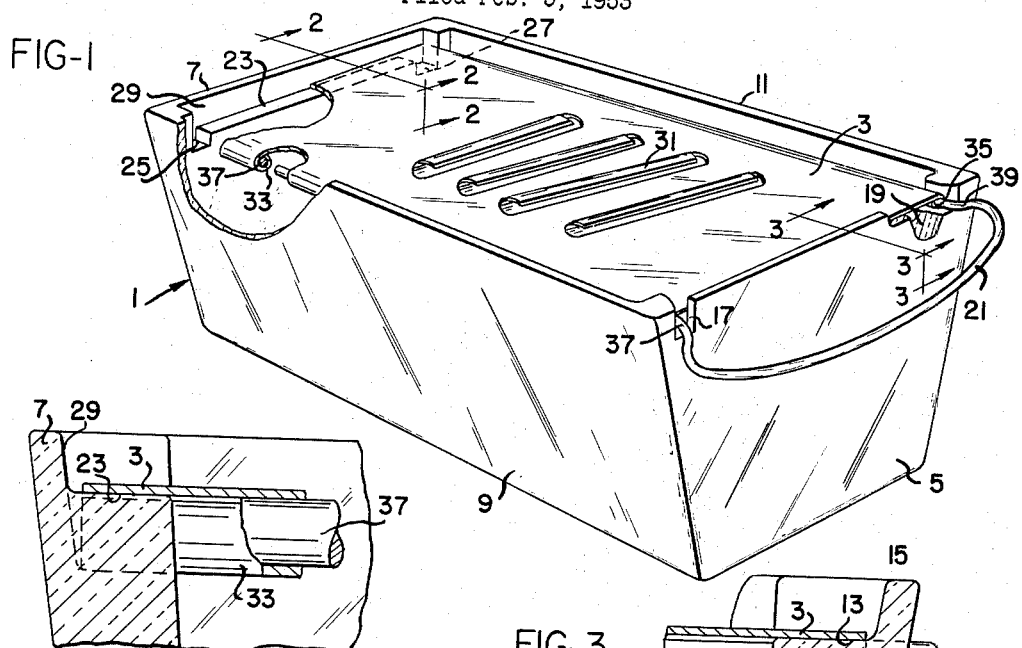
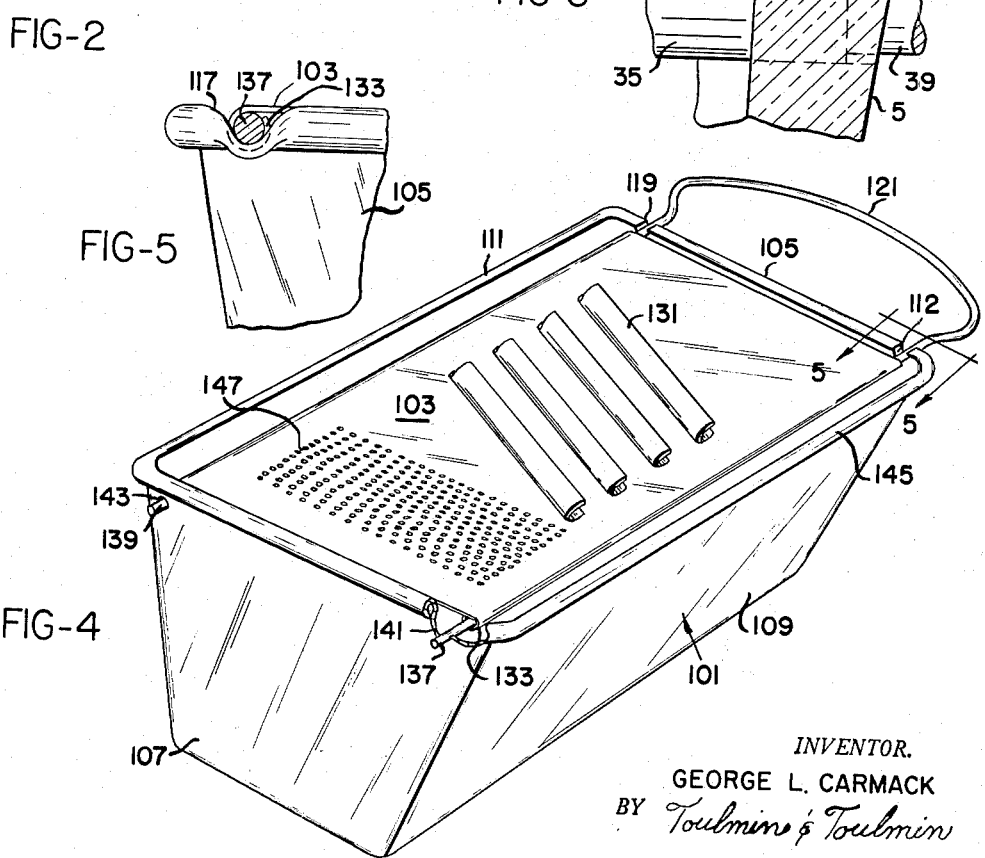
INVENTOR.
GEORGE L. CARMACK
BY Toulmin & Toulmin
ATTORNEYS United States Patent Office 2,714,908
Patented Aug. 9, 1955

2,714,908

SLAW CUTTER

George L. Carmack, Bluffton, Ohio, assignor to Bluffton Slaw Cutter Co., Bluffton, Ohio, a copartnership Application February 5, 1953, Serial No. 335,291

11 Claims. (Cl. 146—171)

This invention relates to a new and improved cutter for slaw, vegetables and the like.

A primary object of the present invention is to provide a novel combination of vegetable cutter and receiving vessel for the material cut.

A particular object of the invention is to provide a cutter-receiver combination in which the cutter is readily removable from the receiver.

An important object of the invention is to provide a cutter-receiver combination in which the cutter is securely held on the receiver during the cutting operation but is removable therefrom by a single substantially vertical motion.

Another object of the invention is to provide a cutter-receiver combination in which the cutter is provided with a handle positioned well removed from the cutting portion and which handle facilitates removal of the cutter from the receiver.

These and other allied objectives of the invention will become apparent from the following detailed description and the accompanying drawings wherein:

Figure 1 is a perspective view, partially broken away, of a preferred embodiment of the invention;

Figure 2 is an enlarged view taken on line 2—2 of Figure 1;

Figure 3 is an enlarged view taken on line 3—3 of Figure 1;

Figure 4 is a perspective view, in which parts are broken away, illustrating a further embodiment of the invention; and Figure 5 is an enlarged view taken on line 5—5 of Figure 4.

Referring to the drawings there is shown in the preferred embodiment of the invention at 1 in Figure 1 a container having a slaw or vegetable cutter 3 mounted therein between the end walls 5, 7 thereof. The cutter 3 is somewhat narrower than the interior of the container and defines longitudinal spacings with the longitudinal walls 9, 11.

Wall 5 of the container is cut away internally and centrally adjacent the upper end thereof to provide a lateral ridge 13 (Figure 3) from which there extends upwardly a slightly tapered abutment wall portion 15.

Bounding the ridge 13, and extending upwardly through the top edge of the wall 5 are a pair of slots 17, 19; these slots as shown in Figure 1 also extend below the ridge 13 and pass completely through the wall 5 and are accordingly adapted to have the handle portion 21 of the slaw cutter positioned therethrough.

The opposite end wall 7 of the container 1 is also provided internally with a ridge 23, which similarly to the ridge 13 is bounded by slots as at 25 and 27. These slots extend through the wall top and below the level of the ridge but do not pass through the wall. Extending upwardly from the ridge 23 is a slightly tapered abutment wall portion 29.

The slaw or vegetable cutter 3 is substantially a flat sheet of metal having cutter blades 31 slightly raised therefrom and extending laterally thereof. These cutter blades may take any convenient form and as shown are particularly adapted for the cutting of slaw.

Depending from the opposite longitudinal edges of the cutter 3 are in-turned portions 33, 35 of the metal sheet; these in-turned portions each define a longitudinal opening and arms 37, 39 extending from the handle portion 21 pass substantially completely therethrough.

In the assembled position of the combination (Figures 1 to 3) the undersurface of the opposite lateral edges of the metal sheet of the cutter are positioned on the ridges 13, 23 and against the abutment wall portions 15 and 29; the taper of the wall portions facilitates this mounting without substantially affecting the rigidity of the combination. If desired a slight tolerance may be provided between the wall portion and plate as indicated in the drawings (Figures 2 and 3).

The depending in-turned portions 33, 35 have their extremities resting in the slots 17 and 19, respectively, and 25 and 27, respectively. Also in this assembled condition the arms 37, 39 extend from the depending portions to pass through the slots 17 and 19 to terminate in the handle 21. Thus the metal sheet and the cutter as a whole is secured against longitudinal and lateral movement.

With the described structure the cutter and cutter blades may be employed to cut even the heaviest of materials such as cabbages, but removal of the cutter through the slots 17, 19 is accomplished readily by a slight vertical force on the handle 21.

In the embodiment of the invention shown in Figure 4, the container 101 mounts the cutter 103 between walls 105 and 107 and the cutter is spaced from the longitudinal walls 109, 111. The handle 121 is integral with the arms 137 and 139 which are housed in spaced depending portions as at 133.

However in the present instance (Figures 4 and 5) the wall 105 is not ridged but is merely slotted to receive ends of the arms 137 and 139. The other ends of these arms pass through the spaced ports 141, 143 of wall 107 and terminate exteriorly of the wall. With this arrangement the plate 103 is slightly shorter than the distance between the walls 105 and 107 to facilitate removal of the plate; however since the slots 117, 119 are closely positioned adjacent the upper edge of the wall 105 and since the plate has some inherent resiliency the tolerance need only be very slight and may be afforded by a slight internal tapering of the walls.

It is to be noted that in the structure shown in Figures 4 and 5 the slotting of the wall for receipt of the arm portions may be facilitated if the edge of the container 1 is provided with a portion 145 which is turned slightly under. This arrangement provides for a large bulk of metal which may be readily depressed as shown in Figure 5 without adding materially to the weight of the structure.

In connection with the foregoing embodiments of the invention, it is to be particularly noted that very little modification of standard receivers or standard cutters is necessary to attain the novel structural combination.

Further, each of the basic components of the combination of invention may be employed separately; thus each has utility without the other.

The combination is also advantageous from a production point of view for it has relatively few parts and is accordingly commercially practicable.

It is further to be noted that other features may be incorporated into the structure of invention, as for example, the grater element at 147 in Figure 4.

It will be understood that this invention is susceptible to modification in order to adapt it to different usages and conditions and accordingly, it is desired to comprehend such modifications within this invention as may fall within the scope of the appended claims.

I claim:

1. In combination, a vegetable cutter and an open top container, the said container having a pair of opposed walls and the said cutter being supported therebetween below the top thereof and having a U-shaped handle of the cutter passing through one said wall below the top thereof, the one said wall being slotted vertically to permit upward removal of the cutter from the container.

2. In combination, a vegetable cutter and an open top container, the said container having a pair of opposed walls, one of which has spaced vertically extending slots, the said cutter being supported between the walls and having means which pass into said slots and constitute support for said cutter at one end of said container.

3. In combination, a vegetable cutter and an open top container, the said container having a pair of opposed walls, one of which has spaced vertical slots, the said cutter being supported between the walls and having depending tubular portions having arms passing therethrough into said slots to constitute support for said cutter at one end of said container.

4. In combination, a vegetable cutter and an open top container, the said container having a pair of opposed walls one of which has spaced vertical slots, the said cutter being supported between the walls and having depending in-turned tubular edge portions having arms passing therethrough into said slots to constitute support for said cutter at one end of said container.

5. In combination, a vegetable cutter and an open top container, the said container having a pair of opposed walls one of which is provided with an internal ridge bounded by slots extending through the one wall vertically to the top thereof, the said cutter being supported between the walls on the ridge and having a portion thereof extending through a said slot whereby an upward movement on said portion permits removal of said cutter from said container.

6. In combination, a vegetable cutter and an open top container, the said container having a pair of opposed walls one of which is provided with an internal ridge and bounding slots extending through the wall from the ridge in both vertical directions, the said cutter being supported between said walls on said ridge and having depending portions engaging in said slots.

7. In combination, a vegetable cutter and an open top container, the said container having a pair of opposed walls one of which is provided with an internal ridge and bounding slots extending through the wall from the ridge in both vertical directions, the said cutter being supported between said walls on said ridge and having depending portions engaging in said slots, said depending portions having extending therefrom and through the wall legs of a substantially U-shaped handle portion.

8. In combination, a vegetable cutter and an open top container, the said container having a pair of opposed walls one of which is internally ridged to define an abutment portion of said wall, the wall having slots bounding said ridge extending therethrough and upwardly through the top of said wall, the said cutter being supported between said walls and on said ridge and terminating against said abutment portion.

9. In combination, a vegetable cutter and an open top container, the said container having a pair of opposed walls one of which has an internal ridge and an abutment portion extending upwardly from the ridge, the said wall also having slots therein bounding the ridge, the said cutter being supported between the walls on the ridge against the abutment portion, and having arms supported thereon extending into said slots.

10. In combination, a vegetable cutter and an open top container, the said container having a pair of opposed walls each of which is internally ridged and has an abutment portion extending upwardly therefrom and each said wall having therein slots bounding said ridge, the said cutter being supported on said ridges between said walls and having longitudinally depending arms extending into said slots.

11. In combination, a vegetable cutter and an open top container, the said container having a pair of opposed walls one of which is provided with vertical slots and the other of which is provided with spaced ports, the said cutter being supported between said walls and having laterally spaced extending arms depending therefrom and passing through said spaced ports and also through said vertical slots whereby the said cutter is supported.

References Cited in the file of this patent

UNITED STATES PATENTS

| | | |
|---|---|---|
| 259,887 | McCobb | June 20, 1882 |
| 337,619 | Salmon et al. | Mar. 9, 1886 |
| 1,079,226 | Emanuel | Nov. 18, 1913 |
| 2,508,320 | Wheelwright | May 16, 1950 |

FOREIGN PATENTS

| | | |
|---|---|---|
| 7,856 | Great Britain | 1913 |
| 666,212 | Germany | Oct. 13, 1938 |